US005120376A

United States Patent [19]

Hong

[11] Patent Number: 5,120,376

[45] Date of Patent: Jun. 9, 1992

[54] METHOD AND APPARATUS FOR MANUFACTURE OF A LIGHT-PROOF AND FOLDED WINDOW CURTAIN

[76] Inventor: Amy Hong, No. 9, Jenn-Shing Lane, Fu-Nan Village, Fu-Shing, Changhua Shiann, Taiwan

[21] Appl. No.: 648,957

[22] Filed: Feb. 1, 1991

[51] Int. Cl.[5] .......................... B32B 31/04; B32B 31/28

[52] U.S. Cl. .......................... 156/73.1; 156/91; 156/204; 156/227; 156/272.2; 156/379.8; 156/459; 156/469; 156/474; 156/539; 156/543; 156/580.1; 428/181

[58] Field of Search .............. 156/204, 200, 474, 459, 156/469, 539, 543, 275.1, 227, 73.1, 580.1, 91, 272.2, 379.8; 160/84.1; 493/413, 426; 428/181; 270/37

[56] References Cited

U.S. PATENT DOCUMENTS 4,861,404 8/1989 Neff .......................... 156/204
4,974,656 12/1990 Judkins .......................... 160/84.1

*Primary Examiner*—Michael W. Ball
*Assistant Examiner*—Michele K. Yoder
*Attorney, Agent, or Firm*—Browdy and Neimark

[57] ABSTRACT

The method and the apparatus for manufacture of a light-proof and folded window curtain are disclosed. A plane curtain material is folded repeatedly into a plurality of folded parts of an equal width, which are subsequently joined together on the same side of the curtain to form close-knit shoulders through which the curtain holes are arranged at a predetermined position for accommodating a string. A positioning apparatus is employed to hold firmly the groove portions of the folded curtain material, so as to permit two adjacent folded parts to stay closely together. An adapting apparatus is subsequently used to form a shoulder of a predetermined width from two adjoining folded parts. A series of shoulders are formed from a plurality of groups with each containing two adjoining folded parts on the same side of the folded curtain material.

10 Claims, 5 Drawing Sheets

METHOD AND APPARATUS FOR MANUFACTURE OF A LIGHT-PROOF AND FOLDED WINDOW CURTAIN

BACKGROUND OF THE INVENTION

There are a series of holes arranged on a conventional window curtain for facilitating a string to pass through. The obstruction to the light by a conventional window curtain as such is faulty in such a way that the curtain holes so arranged permit the light to pass through. In addition, the curtain holes so disposed could be used improperly as peep holes. In order to remedy the shortcoming mentioned above, a Y-shaped and folded window curtain impervious to light is made available, in which the curtain is first shaped into parallel grooves and ridges. The shoulders of a predetermined width extending outward from the ridge tops are so arranged that a series of shoulders are formed on the curtain. Located at the corresponding positions on a series of shoulders are curtain holes for accommodating a string to pass through, as shown in FIG. 1.

It must be stated unpretentiously that the Y-shaped and folded window curtain impervious to light mentioned above is by no means a product of recent introduction. However, the method and the apparatus available for its production in quantity at a low cost have not been introduced so far. Therefore, consumers at large have not been able to purchase the product as such at a reasonable and affordable price.

SUMMARY OF THE INVENTION

The primary objective of this invention is to provide the method and the apparatus having an industrial value for use in making a light-proof and folded window curtain in quantity and at a cost affordable to the consuming public.

In keeping with the principles of this invention, the primary objective is accomplished by the method and the apparatus, in which a plane curtain material is folded repeatedly into plurality of folded parts of an equal width, which are subsequently joined together on the same side of the curtain to form close-knit shoulders through which the curtain holes are arranged at a predetermined position to accommodate a string.

This invention is charactized by the uniqueness of the method, by which the shoulders are joined together. A positioning apparatus is employed to hold firmly the groove portions of the folded curtain material, so as to permit two adjacent folded parts to stay closely together. An adapting apparatus is subsequently used to form a shoulder of a predetermined width from two adjoining folded parts. Therefore, a series of shoulders are thus formed from a plurality of groups with each containing two adjoining folded parts on the same side of the folded curtain material.

DETAILED DESCRIPTION OF THE PREFERRED EMBODIMENT

Figure 1:
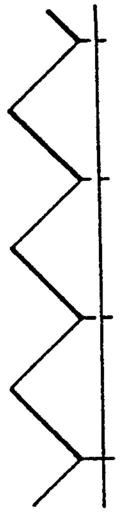
FIG.1 PRIOR ART
FIG. 1 shows a schematic view of a Y-shaped, light-proof, and folded window curtain of the conventional type.
Figure 2:
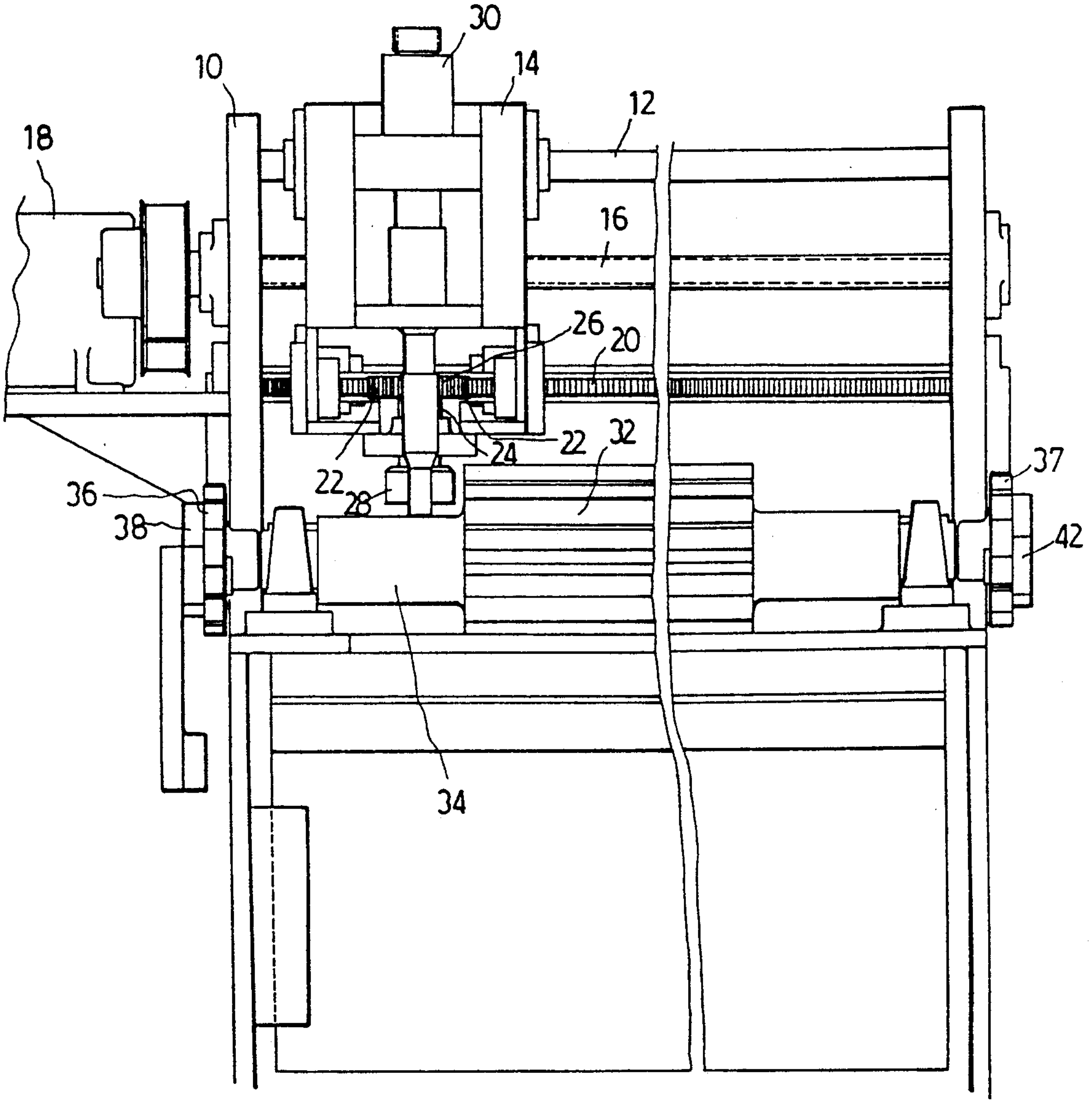
FIG. 2 shows a front view of the scheme of the preferred embodiment according to this invention.
Figure 3:
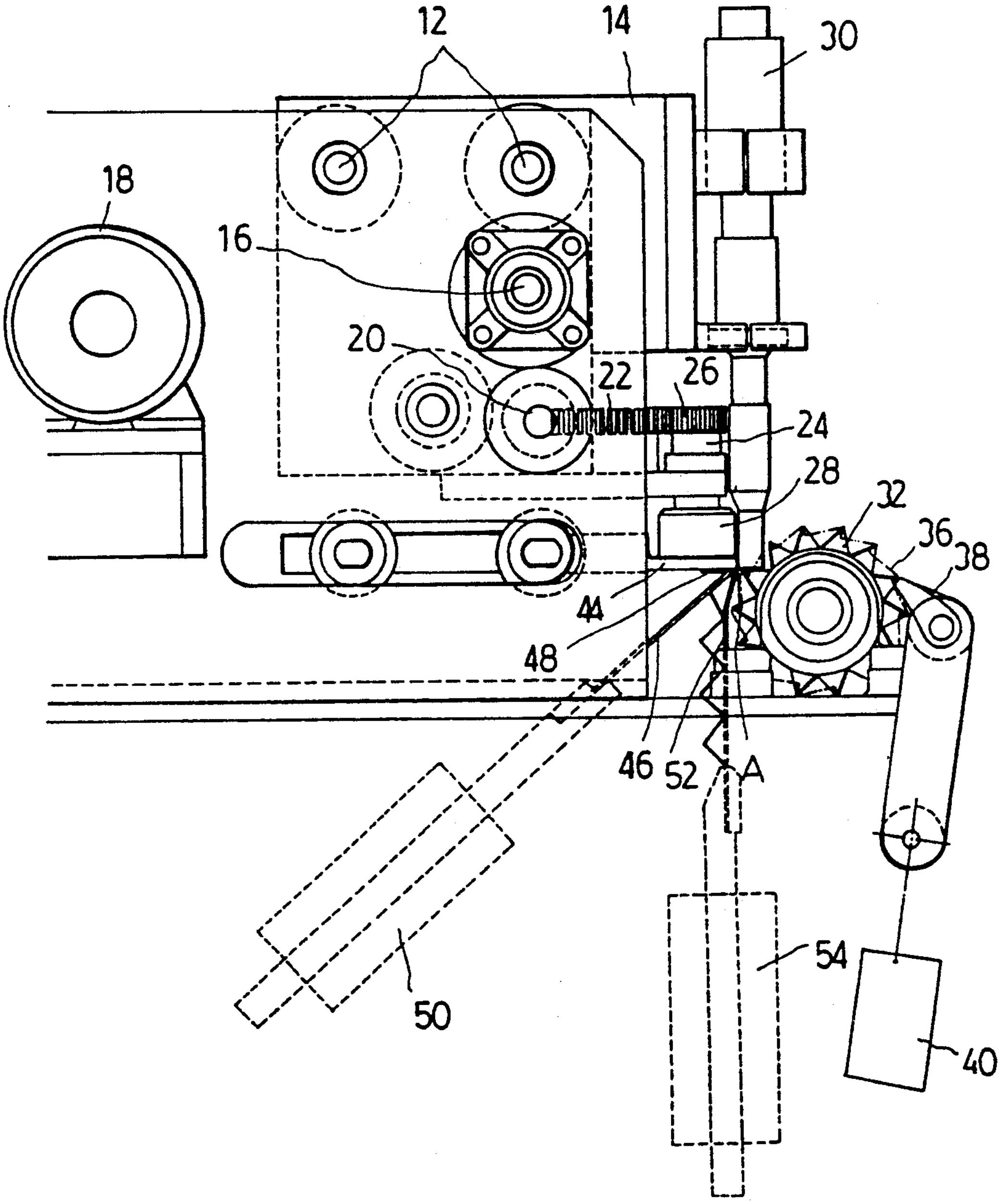
FIG. 3 shows a side view of the scheme of the preferred embodiment according to this invention.

Referring to FIGS. 2 and 3, the apparatus embodiment in this invention is shown comprising:

a machine stand 10;

two parallel sliding rails 12, installed horizontally and fastened to the upper portion of the machine stand 10;

a base body 14, pivotally mounted on two sliding rails 12 and capable of sliding axially along the sliding rails 12;

a screw rod 16, positioned under the two sliding rails 12 in a parallel manner and fastened to the base body 14;

a motor 18 to activate the screw rod 16 to turn right or left so as to drive the base body 14 to make a reciprocating movement;

an indented rod 20, attached horizontally to the machine stand 10 and positioned under the screw rod 16;

two gear wheels 22, pivotally arranged at the lower portion of the base body 14 and engaged with the indented rod 20;

a support element 24, pivotally arranged at the lower portion of the base body 14; having a gear 26 which is disposed at the top thereof and engages with two gear wheels 22, and having a press wheel 28 which is disposed at the bottom end thereof and is capable of being activated to rotate at a corresponding speed by the gear 26, which in turn is driven by two gear wheels 22 whenever the base body 14 moves;

an adapting element 30, which is a high frequency generator in itself, pivotally mounted right in front of the support element 24 and capable of making a reciprocating movement within a predetermined range of distance between a switch-on position away from the support element 24 and switch-off position adjacent to the support element 24;

a rotary wheel 32, which is an elongated column body with both ends thereof forming cylindrical portions designated as preparatory areas 34 having a diameter smaller than that of the column body of the rotary wheel 32; mounted pivotally and horizontally on the machine stand 10 and beneath the adapting element 30 and having a predetermined number of triangular projections disposed axially at equal intervals;

two ratchet wheels 36 and 37, fastened separately to both ends of the rotary wheel 32;

a ratchet holder 38, attached to the machine stand 10 and controlled by a cylinder 40 for its up-and-down motion to hold the ratchet wheel 36 by rotating counter-clockwise, as shown in FIG. 3;

a pawl 42 consisting of a hinged tongue, the tip of which engages with the notches of the ratchet wheel 37 and thus allows the motion of the rotary wheel 32 in only one direction;

a suppressing element 44, mounted horizontally on the machine stand 10 and under the support element 24; with front end thereof having a vertical surface and bottom thereof being a horizontal surface; controllable by means of a cylinder to permit a reciprocating motion thereof within a predetermined range of distance between the suppressed position adjacent to the rotary wheel 32 and the released position away from the rotary wheel 32; with the horizontal surface of the bottom thereof being slightly higher than the horizontal surface of the projection of the rotary wheel 32 when the position thereof being at the suppressed position and the front end thereof being near the projection of the rotary wheel 32, thus forming a base line A between the suppressing element 44 and the projection of the rotary wheel 32;

a sustaining element 46 having an inclined plane of 45 degrees, mounted on the machine stand 10 and under the suppressing element 44; the top end thereof having a horizontal sustaining portion 48; controllable by means of a cylinder 50 to permit a reciprocating motion thereof within a predetermined range of distance between the sustaining position and the feeding position, thus the tip end thereof facing the base line A; and a supplementary support element 52, mounted perpendicularly beneath the support element 24 and located between the sustaining element 46 and the rotary wheel 32; the upper portion thereof bending slightly toward the adapting element 30 and thus facing the base line A; and controllable by means of a cylinder 54 to permit an upward and momentary thrust thereof for a predetermined height and thereafter to resume rapidly the threshold position thereof.

The embodiment at work according to this invention is expounded hereinafter, in conjunction with FIGS. 4-9.

Figure 4:
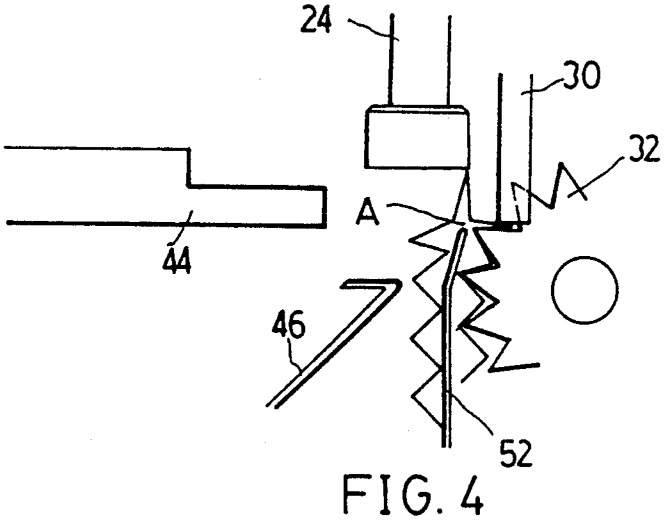
FIGS. 4–9 show a series of schematic views of the preferred embodiment at work according to this invention.

Referring to FIG. 4, the suppressing element 44 is shown retreating to a released position, before the operation, while the sustaining element 46 withdraws inclinationally toward the feeding position in conjunction with the supplementary support element 52 being at the preparing position. The support element 24 and the adapting element 30 are located at the preparatory area of the rotary wheel 32. In the meantime, the adapting element 30 is at the threshold of the switch -on position. A portion of the folded window curtain is hanged manually by an operator over the horizontal surface of the projections of the rotary wheel 32, while the front edge of the folded parts is vertically hanged between the rotary wheel 32 and the supplementary support element 52.

Figure 5:
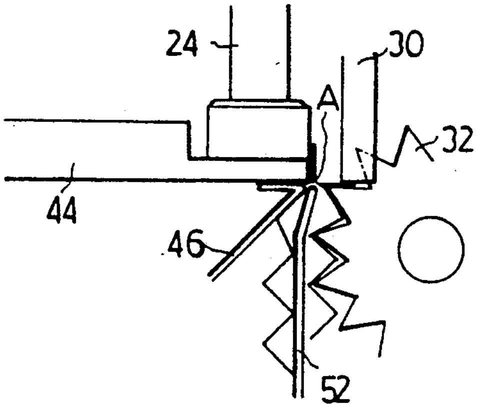

As shown in FIG. 5, the suppressing element 44 is shown moving forward to press against the groove portion of the continuously folded curtain, so as to cause two folded parts, which are being pressed against by the suppressing element 44, to join together vertically. In the meantime, the other two folded parts located on the right side are brought together horizontally on the horizontal surface of the projections of the rotary wheel 32. The sustaining element 46 is subsequently raised to a sustaining position in order to bring together horizontally two adjacent folded parts located on the left side, which are now also pressed under the suppressing element 44, so as to permit the bottom portion of the vertically grouped folded parts of the curtain to position over the base line A.

Figure 6:
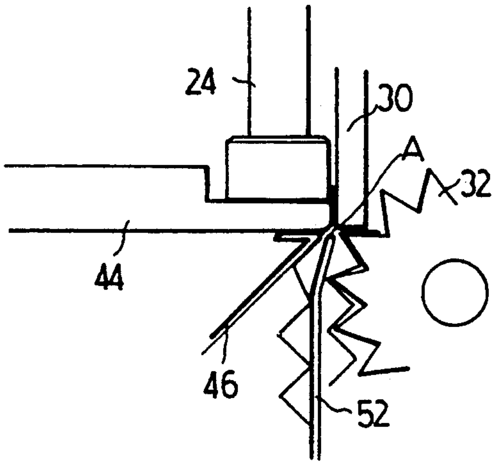

Now referring to FIGS. 2, 3 and 6, a motor 18 is shown driving a screw rod 16, which in turn drives the base body 14 to move to make contact with one side of the folded curtain material. The accuracy of this process can be checked with a micro switch or an electronic eye. The adapting element 30 must be at a switch-off position and cooperates with the support element 24 in holding the vertically adjoining folded parts while the base body 14 continues to move. The support element 24 affixed to the left side of the curtain material will roll, while the high frequency rod of the adapting element 30 welds the upper edge of the two adjoining folded parts to form a shoulder. Thereafter, the base body 14 moves from the preparatory area of one end to that of another end in order to prevent the mechanical interference with the feeding process of the curtain material.

Figure 7:
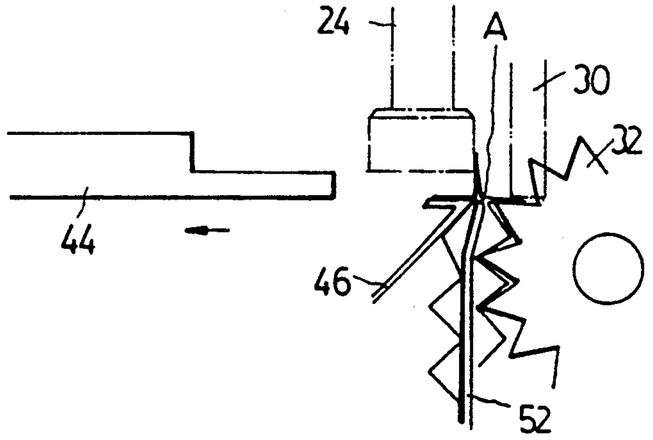

As shown in FIG. 7, the base body 14 has moved over to another preparatory area to allow the adapting element 30 to move to a switch-on position, resulting in a withdrawal of the suppressing element 44 to a released position again.

Figure 8:
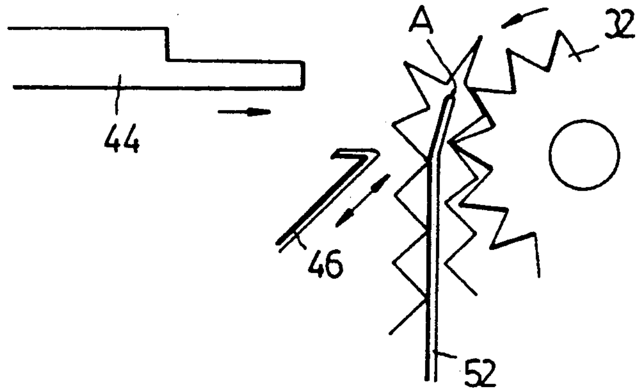

As shown in FIG. 8, the sustaining element 46 has so rapidly descended to a feeding position that the position of its tip portion is slightly lower than the lower portion of the second set of adjoining folded parts located on the left. In the meantime, the rotary wheel 32 rotates counter-clockwise to turn the curtain material by means of its projections at a high speed, exerting a right-hand and downward pull on the curtain material to prevent it from falling. The descended sustaining element 46 mentioned previously has risen to a sustaining position from a feeding position, forcing the second set of adjoining folded parts located on the left to rise as well. The foregoing grouping of folded parts located on the right subsequently moves downward, as a result of having been turned by the rotary wheel 32, to cause the folded parts already united to rest on the horizontal surface of the projection located on the right. The adjoining folded parts being held up on the left begins moving to the center in a vertical manner by virtue of the interacting forces of an upward push and a right-hand pull. In the meantime, the suppressing element 44 moves forward to a suppressing position so as to cause the two folded parts located at the center to adjoin in an upright manner. Subsequently, the sustaining element 46 again moves to a sustaining position in order to have the two folded parts on the left pressed against the bottom of the suppressing element 44, as was previously shown in FIG. 5. The base body 14 returns to its starting point while a new shoulder is being formed from two folded parts which have freshly united. The processes described above are so repeated that a series of shoulders are formed eventually.

Figure 9:
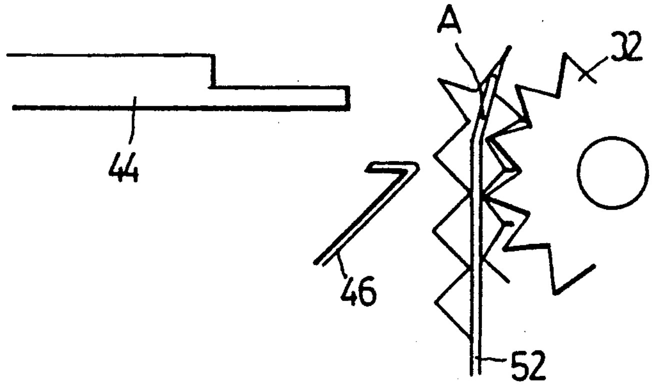

Referring to FIG. 9, there is an electronic eye detector (not shown in the drawing) disposed beneath the base line A to uncover the drooping of the curtain material in process. The rectification of a drooping incident is initiated by the electronic eye detector, which triggers at once the supplementary support element 52 to uphold the drooped curtain material in process, while the suppressing element 44 and the sustaining element 46 are instructed to return to their respective threshold positions before they have moved to a suppressing position and a sustaining position respectively. The upper portion of the supplementary support element 52 is intentionally designed in such a way that it bends slightly toward the adapting element 30, the reasons being that it may avoid interfering mechanically with the suppressing element 44 and the sustaining element 46 and that it permits the curtain material supported by the supplementary support element 52 to be turned downward to the right by the rotary wheel 32, so as to ensure that the process of turning and feeding the curtain material is properly executed.

The embodiment of this invention described above is to be considered in all respects as merely an illustration of principles of the invention. For example, an ultrasonic apparatus or a sewing apparatus can be employed in place of a high frequency generator used as an adapting element in the embodiment of this invention. Accordingly, the invention is to be limited only by the scope of the hereinafter appended claims.

What is claimed is:

1. A method for the manufacture of a light-proof and folded window curtain comprising the steps of:

folding a plane curtain material repeatedly into a plurality of folded parts of an equal width;

employing positioning means for consecutively holding firmly each groove portion of said plurality of folded parts so that two adjacent sides of each of said folded parts stay closely together;

consecutively applying an adapting means for joining a portion of each of said two adjacent sides of each of said folded parts to form a series of shoulders of a predetermined width on the same side of said curtain material wherein said positioning means comprises:

a rotary wheel, which is an elongated column body and is mounted pivotally and horizontally on a machine stand and beneath an adapting element and has a predetermined number of triangular projections disposed thereon axially at equal intervals;

a suppressing element, mounted horizontally on said machine stand and under a support element; with a front end thereof having a vertical surface and a bottom thereof having a horizontal surface;

a sustaining element having an inclined plane of 45 degrees, mounted on said machine stand and under said suppressing element; a top end portion thereof having a horizontal sustaining portion; and a supplementary support element mounted perpendicularly beneath said support element and located between said sustaining element and said rotary wheel; an upper portion thereof bending slightly toward said adapting element.

2. The method for the manufacture of a light-proof and folded window curtain in accordance with claim 1, wherein said adapting means is an ultra-sonic welder, or a high frequency welder, or a sewing device.

3. The method for the manufacture of a light-proof and folded window curtain in accordance with claim 1, wherein said adapting means comprises:

a base body slidably mounted on sliding rails;

a support element arranged pivotally at the lower portion of said base body; and an adapting element mounted pivotally right in front of said support element.

4. The method for the manufacture of a light-proof and folded window curtain in accordance with claim 3, wherein said adapting means further comprises a press wheel associated with said base body.

5. The method for, manufacture of a light-proof and folded window curtain in accordance with claim 1, wherein said adapting means comprises an adapting element which is a high frequency generator.

6. An apparatus for the manufacture of a light-proof and folded window curtain comprising:

means for folding a plane curtain material repeatedly into a plurality of folded parts of an equal width;

positioning means for consecutively holding firmly each groove portion of said plurality of folded parts so that two adjacent sides of each of said folded parts stay closely together;

adapting means for consecutively joining a portion of each of said two adjacent sides of each of said folded parts to form a series of shoulders of a predetermined width on the same side of said curtain material means for arranging holes at a predetermined position of said shoulders to accommodate a string;

wherein said positioning means comprises;

a rotary wheel, which is an elongated column body and is mounted pivotally and horizontally on a machine stand and beneath an adapting element and has a predetermined number of triangular projections disposed thereon axially at equal intervals;

a suppressing element, mounted horizontally on said machine stand and under a support element; with a front end thereof having a vertical surface and a bottom thereof having a horizontal surface;

a sustaining element having an inclined plane of 45 degrees, mounted on a machine stand and under said suppressing element; a top end portion thereof having a horizontal sustaining portion; and a supplementary support element mounted perpendicularly beneath said support element and located between said sustaining element and said rotary wheel; an upper portion thereof bending slightly toward said adapting element.

7. The apparatus for manufacture of a light-proof and folded window curtain in accordance with claim 6, wherein said adapting means is an ultra-sonic welder, or a high frequency welder, or a sewing device.

8. The apparatus for manufacture of a light-proof and folded window curtain in accordance with claim 6, wherein said adapting means comprises:

a base body slidably mounted on sliding rails;

a support element arranged pivotally at the lower portion of said base body; and an adapting element mounted pivotally right in front of said support element.

9. The apparatus for manufacture of a light-proof and folded window curtain in accordance with claim 8, wherein said adapting means further comprises a press wheel associated with the base body.

10. The apparatus for manufacture of a light-proof and folded window curtain in accordance with claim 6, wherein said adapting means comprises an adapting element which is a high frequency generator.

* * * * *